(12) United States Patent
Yeh et al.

(10) Patent No.: US 6,282,798 B1
(45) Date of Patent: Sep. 4, 2001

(54) FINGER-CONTROLLED DEVICE FOR PUSHING SLIDE BARS

(76) Inventors: Fu-Kuo Yeh; Mei-Yun Chen, both of 3F, No. 2, Lane 42, Hou-Kang St., Shih-Lin Dist., Taipei (TW)

( * ) Notice: Subject to any disclaimer, the term of this patent is extended or adjusted under 35 U.S.C. 154(b) by 0 days.

(21) Appl. No.: 09/212,403

(22) Filed: Dec. 16, 1998

(51) Int. Cl.$^7$ ...................................................... G09G 5/08

(52) U.S. Cl. .......................... 33/1 M; 345/157; 345/163

(58) Field of Search ............................... 33/1 M; 345/163, 345/160, 157

(56) References Cited

U.S. PATENT DOCUMENTS

| | | | |
|---|---|---|---|
| 4,995,277 | * | 2/1991 | Yanagisawa ........................ 74/89.15 |
| 5,355,148 | * | 10/1994 | Anderson ............................ 345/166 |
| 5,552,808 | * | 9/1996 | Hsu ...................................... 345/157 |
| 5,661,504 | * | 8/1997 | Lo ........................................ 345/164 |
| 6,034,670 | * | 3/2000 | Chen .................................... 345/163 |
| 6,091,401 | * | 7/2000 | Chen et al. .......................... 345/156 |

* cited by examiner

*Primary Examiner*—Diego Gutierrez
*Assistant Examiner*—Lydia M. De Jesús
(74) *Attorney, Agent, or Firm*—Bacon & Thomas

(57) ABSTRACT

A finger-controlled device for pushing slide bars, including two sets of data carriers, two slide bars and a finger-controlled section for moving the slide bars. Each data carrier corresponds to a sensor for reading 0, 1 signals. Each data carrier has a central shaft disposed with a gear. A face of each slide bar is formed with a rack facing the central shaft for meshing with the gears. The finger-controlled section is movable relative to a housing having an interior chambers for receiving the data carriers, sensors and slide bars. Four side walls of the chamber are formed with through holes for the slide bars to pass therethrough. The housing restrains the slide bars to move relative to and across each other. In operation, the slide bars are moved relative to each other as the finger-controlled section is moved, whereby the data carriers are rotated by a fixed number of circles for use in absolute coordinate input alignment. The slide bars can be widened and thickened to have greater bending strength.

5 Claims, 5 Drawing Sheets

FINGER-CONTROLLED DEVICE FOR PUSHING SLIDE BARS

BACKGROUND OF THE INVENTION

The present invention relates to a finger-controlled device for pushing slide bars, and more particularly to a finger-controlled device with a gear-pushing and mark-amplifying effect. The assembling procedure of the present invention is performed more quickly and the steps of rectifying and alignment are reduced. Moreover, the slide bars are able to bear greater external force.

FIGS. 1 and 2 show a prior finger-controlled device which is minimized and controlled and operated by fingers and is able to achieve accurate alignment. Under a limited operation area, the finger-controlled device is able to correspond to various types of display screen with different sharpness by way of absolute coordinates. Within a very short moving range, the finger-controlled element can correspond to each point on the display screen. The patterned alignment mode is an absolute coordinate alignment system without limitation of sharpness. Within a limited moving range of hardware, the control is achieved by means of the difference of moving speed VX of the finger-controlled element operated by human fingers, whereby the cursor is moved through different distances on the display zone. This is accomplished in such a manner that the limited travelling space of the hardware is divided into several equal parts $C=C_1+C_2...$, wherein $C_1, C_2 ...$ represent the travelling marks respectively of the finger-controlled elements in different speed zones $V_1, V_2 ...$ and at different speeds $V_1, V_2$ correspond to different scales of moving constants $K_1, K_2 ...$ Therefore, it can be planned to make $(K_1*C_1)+(K_2*C_2)...$ =the travel on the display screen.

For example, the limited travelling distance of the hardware=196marks*0.08 mm/mark=15.68 mm of freely set range. Corresponding to the X axis sharpness of display screen =640

$640=(1*C_1)+(4*C_2)$ $K_1=1$, $K_2=4$ $196=C_1+C_2$ so that $C_2=148$, $C_1=48$ That is, by means of the very short limited range of 15.68 mm of the hardware, it is possible to plan 48 marks one to one fine displacement and 148 marks of 1 to 4 rough displacement which corresponds to the X axis 640 sharpness.

In the case that the display screen X axis sharpness is adjusted up to 1024, then $1024=(1*1)+(7*C_2)$ $K_1=1$, $K_2=7$ $196=C_1+C_2$ The value obtained by mode calculation will become $C_2=138$, $C_1=58$.(The X axis is exemplified in the above example. However, it is also applicable to Y axis and will not be further discussed.)

When the sharpness of the display screen is increased from 640 to 1024, the interval between pixel to pixel of the display screen is also shortened. Therefore, the increment of $K_2$ from 4 to 7 will not affect the stability of the cursor travelling on the display screen. Also, no matter how the sharpness of the display screen changes, $K_1$ will always be 1. Therefore, when at slow speed $V_1$, the cursor can still be finely displaced from pixel to pixel. In addition, in the unit arrangement, the positive direction has two recorders and the negative direction also has two recorders for correspondingly calculating the number of the remaining marks during travelling of $C_1$ and $C_2$. The positive and negative directions correspond to each other, so that the finger-controlled element can correctly return to the original point in the index zone. Relatively, the cursor can correctly return to its home point on the display screen so that it can work under various sharpness environments by way of absolute coordinate. It is characterized in that when the finger-controlled element is moved at high speed, the recorders perform the calculation by way that the total displacement of $C_2$ plus 2 $C_1$ minus 1 equal to adding 1. Therefore, without affecting the total counting, the counting is performed at high speed displacement and at the same time the data stored in the $C_1$ recorder is zeroed. Therefore, when the manual displacement is switched from high speed to low speed, the environment of the fixed point reached by the cursor will be zeroed and have sufficient fine displacement for application. In operation, it seems that a fine displaced circle moves along with the cursor over the display screen. Therefore, within a limited travelling range of the hardward, the travel of the cursor can be controlled by way of absolute coordinate and simultaneously accurately correspond to each point on the display screen.

However, although the above structure is minimized, still there are some shortcomings existing in the above arrangements as follows:

1. In assembling procedure, all the data carriers are laid horizontally and stacked and parallel to the slide bars. Therefore, in manufacturing, the alignment necessitates more caution and thus the installation cannot be quickly performed.
2. The space of the structure is minimized so that the shaft rod is relatively thin and light. This makes the wings of the finger-controlled element tend to bend and break when subject to an abnormal upward extracting force. Also, over-rotation of the finger-controlled element may lead to breaking of the wings.

In addition, with respect to a conventional rolling ball mouse structure, the rolling ball often contacts with the table face and tends to be contaminated by dusts or abraded. This will lead to unbalanced rolling and the output data of X, Y axes can be hardly unified.

SUMMARY OF THE INVENTION

It is a primary object of the present invention to provide a finger-controlled device which has not too large in volume and has a gear-pushing and mark-amplifying effect. The assembling procedure of the finger-controlled device is quickened and facilitated and the steps of rectifying and alignment are reduced.

According to the above object, the finger-controlled device of the present invention includes two sets of data carriers, two slide bars and a finger-controlled section. Each data carrier corresponds to a sensor for reading 0, 1 signals. Each data carrier has a central shaft disposed with a gear. A face of each slide bar is formed with a rack facing the central shaft for meshing with the gears. The finger-controlled section has an interior chamber for receiving the data carriers, sensors and slide bars.Four side walls of the chamber are formed with through holes for the slide bars to pass therethrough. The finger-controlled section restrains the slide bars to move relative to and across each other. In operation, the slide bars are moved relative to each other, whereby the data carriers are rotated by a fixed number of circles for use in absolute coordinate input alignment. The slide bars can be widened and thickened to have greater bending strength.

The present invention can be best understood through the following description and accompanying drawings, wherein:

DETAILED DESCRIPTION OF THE PREFERRED EMBODIMENTS

Figure 1:
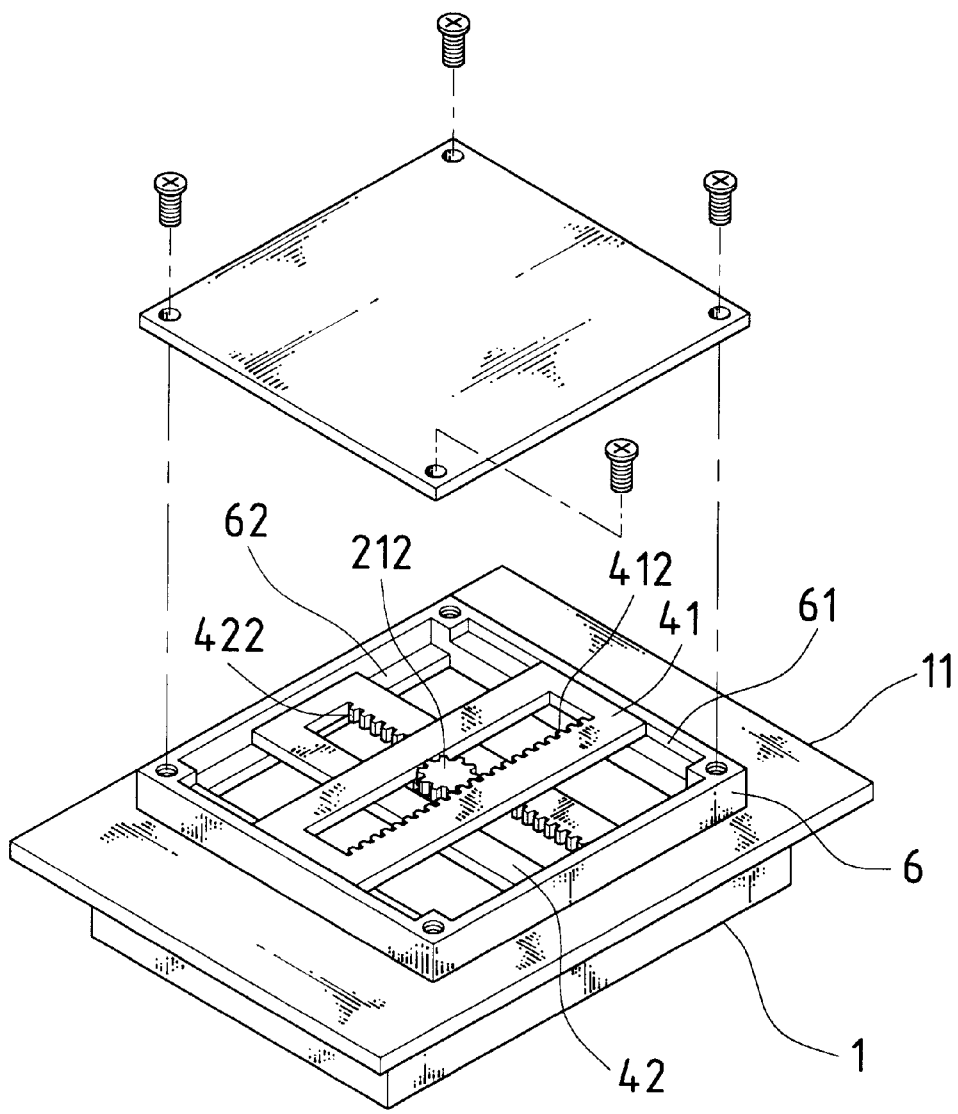
FIG. 1 is a perspective exploded view of a conventional finger-controlled device.
Figure 2:
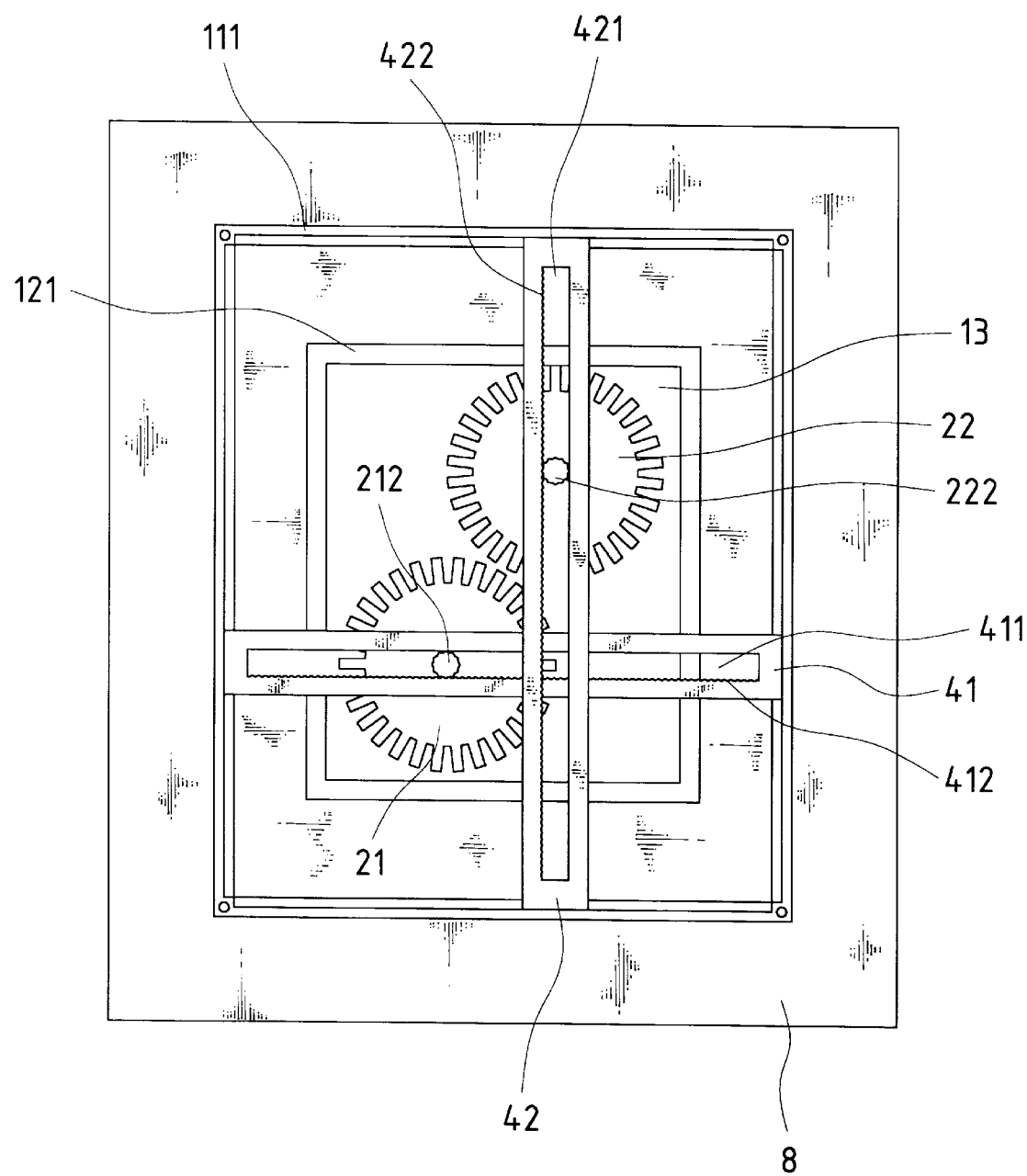
FIG. 2 is a plane assembled view of another conventional finger-controlled device.
Figure 3:
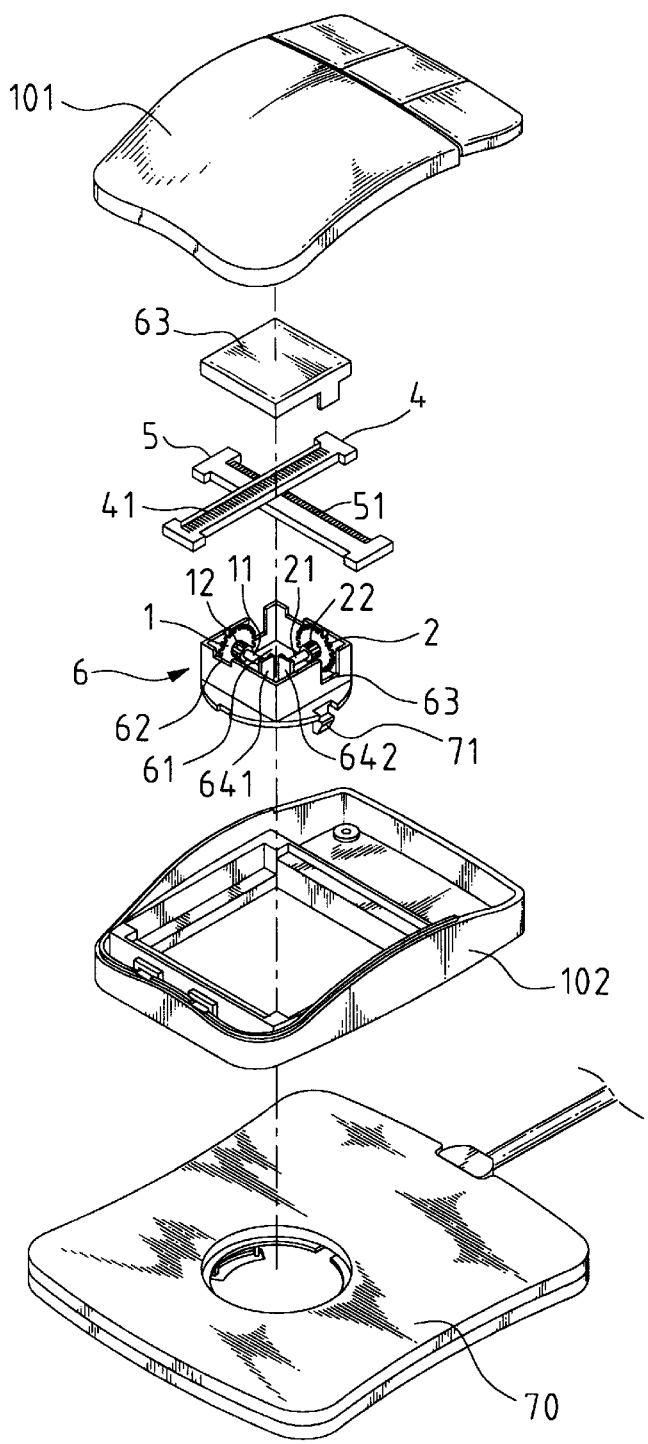
FIG. 3 is a perspective exploded view of the present invention.
Figure 4:
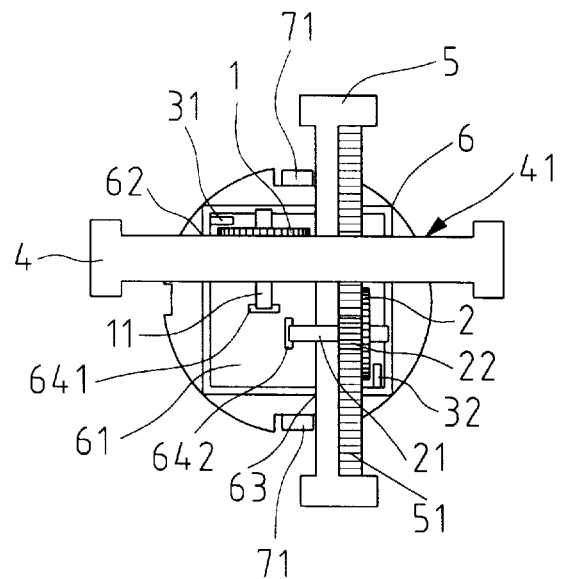
FIG. 4 is a plane assembled view of the present invention.

Please refer to FIGS. 3 and 4. The finger-controlled device of the present invention includes:

two sets of data carriers 1, 2 each of which has a central shaft 11, 21 disposed with a gear 12, 22, whereby when pushed, the data carriers 1, 2 are rotated, the two data carriers 1, 2 being arranged perpendicular to each other, each data carrier corresponding to a set of sensors 31, 32 for reading 0, 1 signals;

two slide bars 4, 5 a face of which is formed with a rack 41, 51 facing the central shaft 11, 21 for meshing with the gears 12, 22, the slide bars 4,5 being fixedly secured to a movable finger-controlled section 100 made up of housing halves 101 and 102 so that the slide bars are moved as the finger-controlled section 100 is moved; and a data carrier housing section 6 having an interior chamber 61 in which two clamping plates 641, 642 are disposed for supporting two ends of the central shafts 11, 21, the chamber 61 also receiving the two sensors 31, 32 and the slide bars 4, 5. Four side walls of the chamber are formed with through holes 62, 63 for the slide bars 4, 5 to pass therethrough upon securing a lid 63 to the side walls. The data carrier housing section 6 restrains the slide bars 4, 5 to move relative to and across each other and is fixedly secured to socket 73 of base 70 by, for example, latching fingers 71, with finger-controlled section 100 being free to move relative to base 70 and housing 100 so as to cause corresponding movement of the slide bars 4,5, and therefore of the data carriers.

Figure 5:
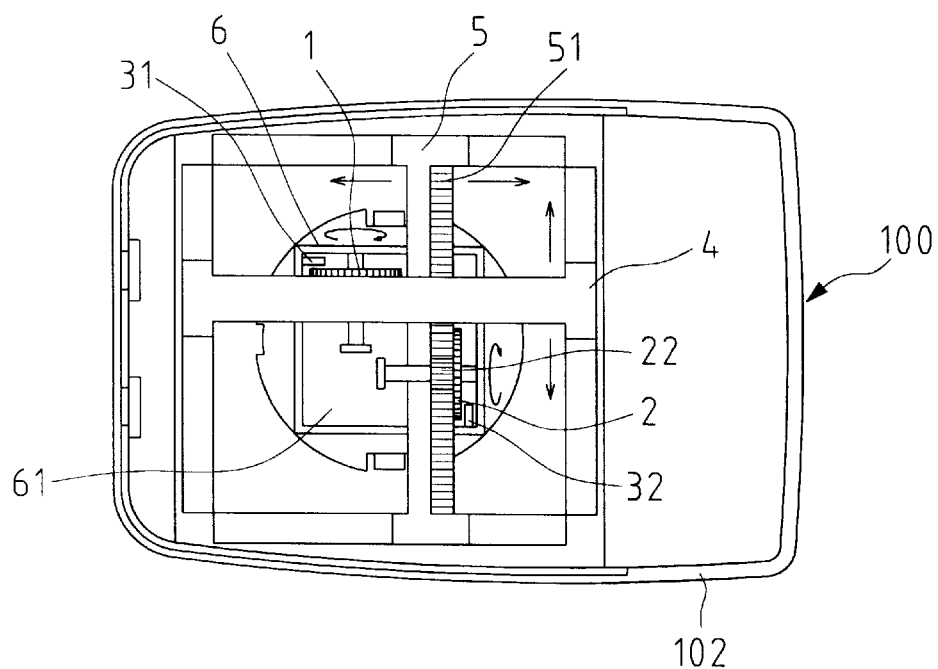
FIG. 5 shows the operation of the present invention.

According to the above arrangement, as shown in FIG. 5, after assembled, the data carriers 1, 2 are located in the housing section 100 and moved along therewith by the slide bars 4, 5. When the finger-controlled section 6 is pushed and shifted, the slide bars 4, 5 are moved back and forth. During operation, via the engagement between the racks 41, 51 and the gears 12, 22, the data carriers 1, 2 representing X and Y axes are rotated by a fixed number of circles. The sensors 31, 32 then generate corresponding 0, 1 signals of a fixed number of marks for use in absolute coordinate input alignment.

Figure 6:
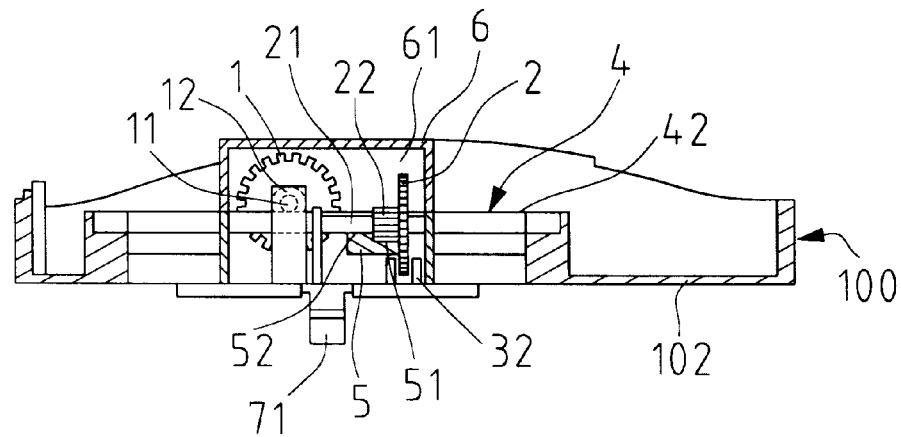
FIG. 6 is a sectional view taken along line A—A'.
Figure 7:
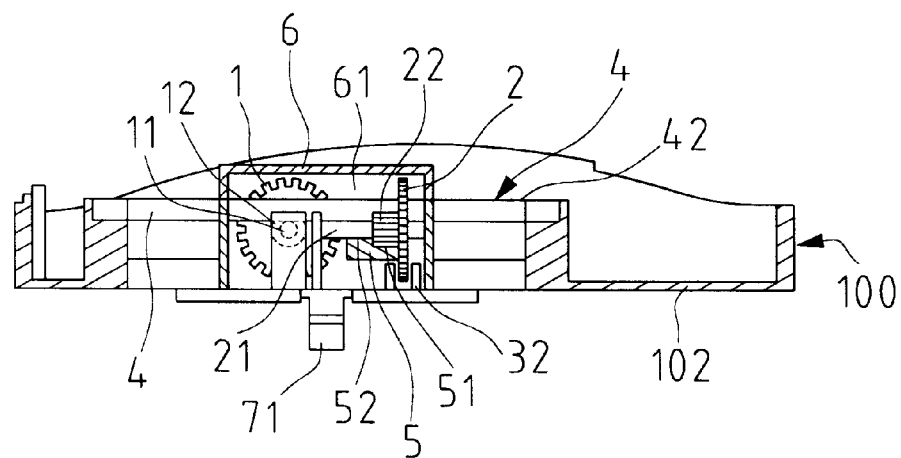
FIG. 7 is a sectional view of another embodiment of the present invention.

Referring to FIG. 6, the central shafts 11, 12 of the data carriers 1, 2 and the slide bars 4, 5 are arranged across each other on different planes. Alternatively, as shown in FIG. 7, the central shafts 11, 12 of the data carriers 1, 2 are positioned on the same plane and the slide bars 4, 5 respectively lean on the central shafts 11, 12 from upper side and lower side. Therefore, the original four layer structure is changed into three layer structure so as to reduce the height of the finger-controlled section 6.

Referring to FIGS. 3 to 7, by means of the novel assembly design of the present invention, the data carriers 1, 2 can be easily assembled as a general mouse without troublesome alignment. More importantly, the slide bars 4, 5 can be widened to bear more great external force without breaking. Therefore, the product is more reliable and durable. FIGS. 6 and 7 show a preferred embodiment in which the slide bars 4, 5 are slat-shaped with a stepped cross-section 42, 52. Accordingly, the cooperative racks 41, 51 can be snugly attached to the central shaft 11, 21 and the gears 12, 22 without swinging gap. In addition, the slide bars can be even more thickened to increase the bending strength of the slide bars 4, 5.

In addition, the bottom of the finger-controlled section 6 can be disposed with a rotary section inserted in the corresponding socket 73 formed on the surface of base board 70. The respective movable components are all disposed on the base board and freely rotatable along with the housing for correctly inputting data. Also, the driving section of the data carriers 1, 2 originally disposed with gears 12, 22 can be alternatively simply a hollow shaft with a linear channel. The slide bars 4, 5 are disposed with corresponding string bodies (not shown). A middle section of the string body is wound around the hollow shaft of the data carriers 1, 2 and then two ends of the string body are tied and fixed to the slide bars 4, 5. Accordingly, the slide bars 4, 5 are movable for driving the data carriers 1, 2 to rotate and achieve the same function.

It should be noted that the above description and accompanying drawings are only used to illustrate some embodiments of the present invention, not intended to limit the scope thereof Any modification of the embodiments should fall within the scope of the present invention.

What is claimed is:

1. A finger-controlled device including a base, a housing section engaged with the base, and a finger-controlled section moveable relative to the base and to the housing section, wherein said housing section includes rotatably-mounted first and second data carriers, said data carriers being oriented perpendicularly relative to each other, and a pair of sensors to sense rotation of the data carriers, wherein said data carriers are mounted on central shafts each having a gear disposed thereon, each gear meshing with a respective slide bar, wherein each slide bar extends through a corresponding opening in the housing section and is affixed to the moveable finger-controlled section such that movement of the finger-controlled section causes said slide bars to move, the housing section constraining the slide bars to move perpendicularly relative to each other, and wherein movement of the slide bars causes said data carriers to rotate relative to said sensors, outputs of said sensors thereby corresponding to movement of said finger-controlled section relative to said base.

2. A finger-controlled device as claimed in claim 1, wherein the central shafts of the data carriers and the slide bars are positioned in different planes.

3. A finger-controlled device as claimed in claim 1, wherein the central shafts of the data carriers are positioned on the same plane, wherein one of the slide bars engages one of the central shafts from an upper side, and wherein another one of the slide bars engages another of the central shafts from a lower side.

4. A finger-controlled device as claimed in claim 1, wherein the slide bars are slat-shaped with a stepped cross-section for snugly attaching to the surface of the central shafts of the data carriers.

5. A finger-controlled device as claimed in claim 1, wherein the housing section is fixed to the base.

* * * * *